March 12, 1957  A. L. JONES  2,784,974
APPARATUS FOR DISTRIBUTING PULVERULENT MATERIAL
Filed May 24, 1949  3 Sheets-Sheet 2

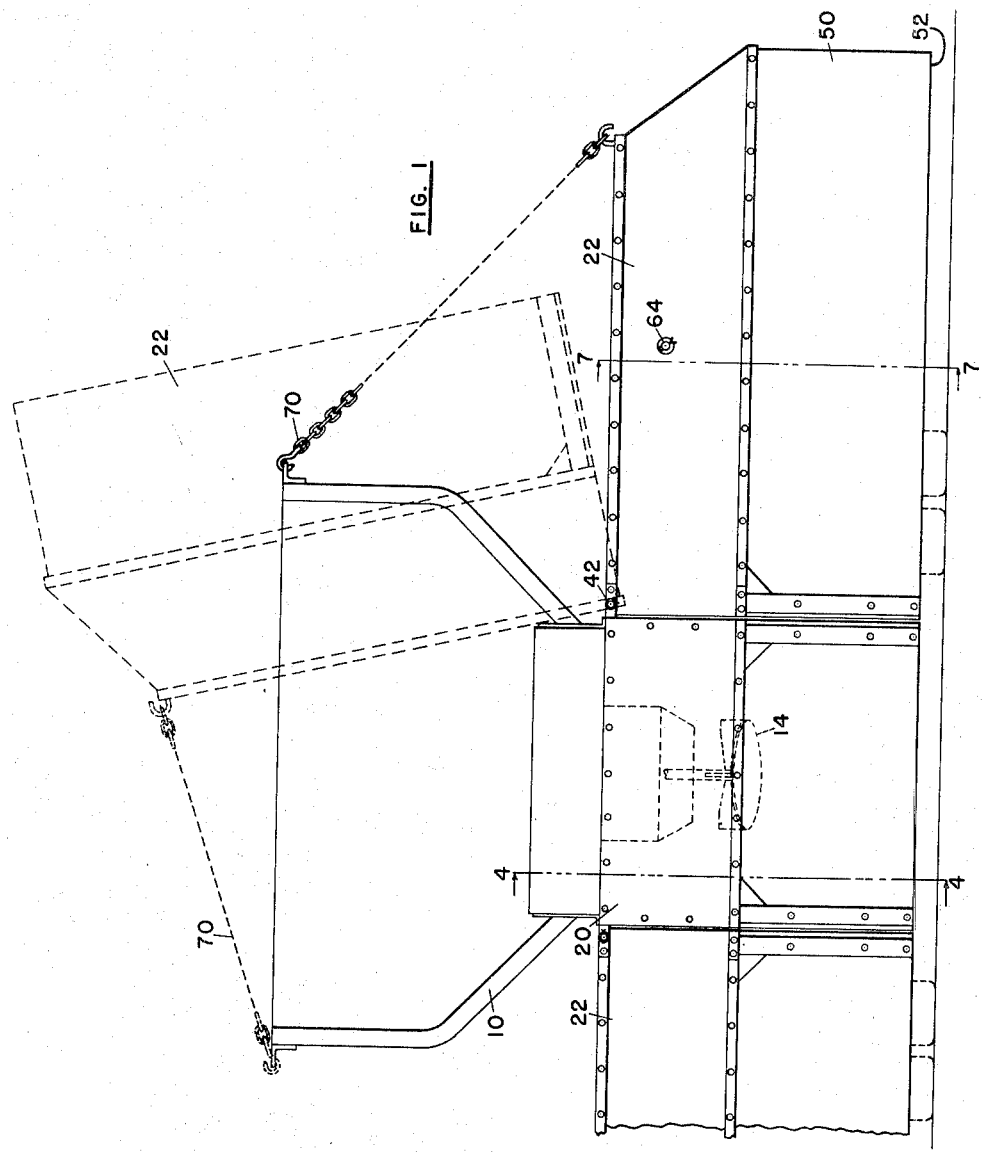

*INVENTOR.*
AUBREY L. JONES
BY
ATTORNEY

March 12, 1957  A. L. JONES  2,784,974
APPARATUS FOR DISTRIBUTING PULVERULENT MATERIAL
Filed May 24, 1949  3 Sheets-Sheet 3

INVENTOR.
AUBREY L. JONES
BY
ATTORNEY

United States Patent Office 2,784,974
Patented Mar. 12, 1957

2,784,974
APPARATUS FOR DISTRIBUTING PULVERULENT MATERIAL

Aubrey L. Jones, Strausburg, Ill.

Application May 24, 1949, Serial No. 95,114

1 Claim. (Cl. 275—2)

This invention relates to a distributor for finely pulverized material, such as, by way of example, phosphate, and more particularly to a non-mechanical distributor adapted to be secured to and carried by the dicharge end of the bed of a conventional limestone spreader.

An object of the invention is to provide a pulverulent distributor which may be attached to a conventional limestone spreader for converting it into a highly efficient phosphate spreader.

Another object of the invention is to provide a pulverulent distributor for attachment to a conventional limestone spreader, which distributor is so constructed and arranged as to non-mechanically produce a uniform distribution of airborne pulverulent material throughout its length and breadth and wherein the dimensional characteristics of the distributor are such as to provide a substantially uniform distribution pattern of pulverulent material onto the ground.

A further object of the invention is to provide a distributor for pulverulent material which is rendered airborne within the distributor by impeller means comprising part of the standard discharge assembly of conventional limestone spreaders.

Still a further object of the invention is to provide a non-mechanical pulverulent distributor for attachment to the discharge end of a conventional limestone spreader, which distributor will thoroughly and effectively provide an even and uniform distribution of pulverulent material, such as, phosphate which is the most difficult to distribute of all commercially available pulverulent materials, throughout a width of from 3 to 5 times the width of the bed portion of the limestone spreader to which the distributor is attached.

Another object of the invention is to provide a pulverulent distributor in the form of an inverted substantially U-shaped shroud or housing to be secured to and carried by the rear portion of the bed of a commercial limestone spreader, said distributor comprising a central portion and a pair of end portions selectively movable with reference to the central portion between raised inoperative and lowered operative positions.

Another object of the invention is to provide a shroud-type pulverulent material spreader-attachment for conventional limestone spreaders, and the like, which will non-mechanically control the density and distribution of a mass of pulverulent particles rendered airborne by the conventional impeller mechanism of the limestone spreader.

Still a further object of the invention is to provide a pulverulent distributor having the hereinabove described characteristics and which is provided with baffle means which continually and automatically preclude stratification of the pulverulent material being discharged therefrom during those periods of time when the uniformity of the material to be distributed is irregular or lumpy, such as occurs when the pulverulent material has become wet.

A further object of the invention is to provide a simple, foolproof pulverulent distributor free of moving parts which may be easily attached to or detached from a commercially available or standard "spreader" type truck bed.

These and other objects are attained by the means described herein and as disclosed in the accompanying drawings, in which:

Fig. 1 is a partial rear elevation of a distributor or spreader attachment of the present invention operatively associated with the rear portion of a conventional "spreader type" bed.

Fig. 2 is a top plan view of the spreader attachment of the present invention.

Fig. 3 is a rear view of the device of Fig. 2.

Fig. 4 is a sectional view taken on line 4—4 of Fig. 1.

Fig. 5 is an enlarged top view of the hinge construction comprising a detail of the present invention.

Fig. 6 is a side view of the detail of Fig. 5.

Fig. 7 is a vertical section taken on line 7—7 of Fig. 1.

Fig. 8 is a partial top plan view showing an alternate form of construction of an end portion of the device.

At the outset is should be understood that phosphate and other finely pulverized substances which are commercially available for distribution upon fields, present, and for many years past have presented distribution problems which the device of the present invention has solved.

Heretofore complicated, expensive and elaborate equipment has been utilized in an effort to distribute, in an even ground-pattern pulverulent material, such as, by way of example, phosphate. These devices have utilized compressed air, screw conveyors, belt conveyors, perforated piping, and other expedients for the purpose of endeavoring to obtain an even distribution of the pulverulent material. However, none of these prior devices has been entirely acceptable to the farmer since they are all subject to certain limitations and are burdened with inherent disadvantages which have greatly restricted their widespread adoption and use.

To further indicate the magnitude of the problem solved by applicant, it will be noted that it is and has been the common practice to spread pulverulent material, such as phosphate during those early morning hours when the prevalence of ground winds is at a minimum, that is, around 3 a. m. When spread during the day season, pulverulent material and particularly phosphate, by reason of its inherent physical characteristics, will billow and drift in such a manner as to render it practically impossible to obtain uniform distribution on the ground. When compressed air, screw or belt type of conveyors are utilized, operational difficulties are frequently encountered which result in clogging or jamming of the distributing mechanism, as a result of which the product will be unevenly distributed, thereby necessitating a succession of operations until the trouble has been remedied. The most common sources of trouble may be attributed to the presence of foreign substances, such as sticks and stones in the pulverulent phosphate, or the presence of excessive moisture which causes a lumping or balling up of pulverulent particles.

The distributor, or spreader attachment of the present invention eliminates all of the disadvantages inherent in the prior art devices and enables the farmer to obtain a superior and even distribution of pulverulent phosphate onto his ground in an even ground pattern using a commercially available limestone spreader as the storage and distributing media for the phosphate.

With reference now to Fig. 1, the numeral 10 indicates generally the hopper or body portion of a spreader-type device, such as, by way of example, a commercially available limestone spreader. The bottom of the hopper or bed is provided with suitable means such as a screw or endless conveyor which is operable for transferring the contents of the hopper to a discharge port 12 (see Fig. 4) thru which the contents of the device are discharged onto an impeller 14 which is caused to rotate by any suitable mechanism not pertinent to the disclosure of the present invention.

It should be understood that the present invention is not directed to nor concerned with the structural details of the hopper, conveyor or impeller; however, for detail and clarity of understanding the Baughman Patent No. 2,120,169, dated June 7, 1938, may, by way of example, be referred to as illustrating a typical commercial device of the so-called "spreader" or limestone spreader, as the term is used herein.

The spreader attachment of the present invention comprises three portions, a central portion 20 and a pair of end portions 22.

Figure 4:
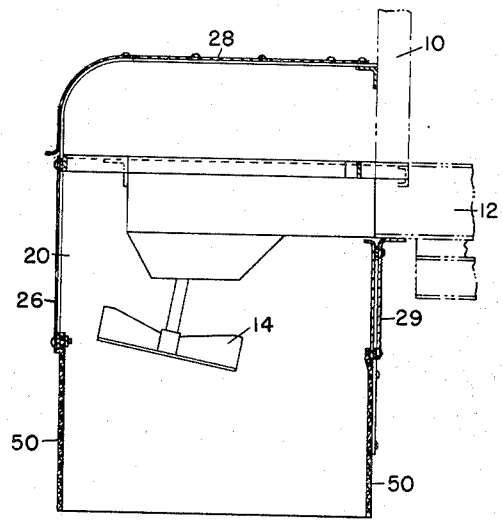

As best disclosed in Fig. 4, central portion 20 is substantially U-shaped in cross section comprising a rear wall 26, a top wall 28 and a front wall 29. This central portion is dimensioned to be releasably secured to the rear portion of hopper 10 and is dimensioned to enclose discharge port 12 and impeller 14. It should be understood that on some spreader devices two or more impellers may be provided instead of the one as illustrated in Figs. 1 and 4; however, for the purposes of the present invention it will be noted that the size of the central portion will be so proportioned as to house whatever impeller means are provided on the particular type of spreader mechanism being used. Attachment of the central portion to the truck bed or hopper may be accomplished by means of suitable structural members which are proportioned to engage parts of the hopper, being securely though releasably fastened thereto by means of bolts or other suitable fastening means.

Figure 7:
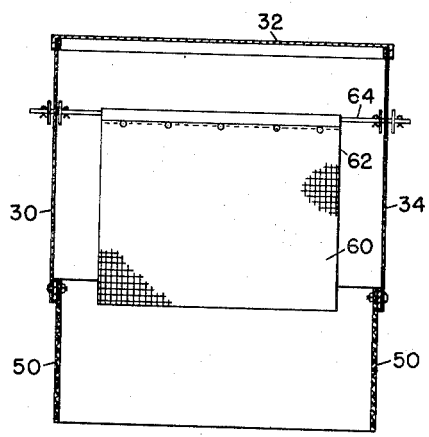

With reference now to Figs. 2, 3, and 7, it will be noted that each of the end portions 22 is generally U-shaped and includes rear, top, front and end walls 30, 32, 34 and 36, respectively.

Figure 5:
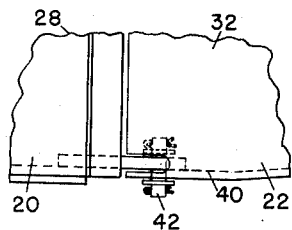
Figure 6:
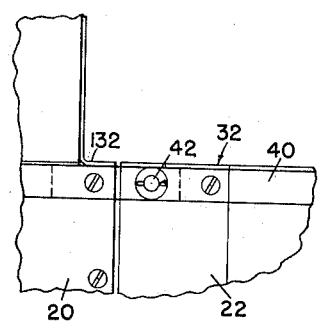

In the preferred embodiment of the invention, end portions 22 are hingedly secured to central portion 20 for enabling the end portions to be moved between lowered and raised positions, see Fig. 1. As best disclosed in Figs. 5 and 6, the end portions are secured along the inner ends of their top wall portions 32 to the top wall portions 132 of the top wall 28 of the central portion. A structural element 40 circumscribes the upper edge of the front and rear walls of the end portions 22, and a hinge member 42 is provided between complementary adjacent portions of the central and end portions, as disclosed.

When the end portions are in a lowered position, they combine with the central portion to define an elongated open bottomed chamber, the overall length of which is the sum of the individual lengths of central portion 20 and end portions 22. Highly satisfactory results have been obtained when the overall length of each of end portions 22 has been of a dimension of from 1 to 3 times the overall width of central portion 20. It will likewise be noted that the width dimension of each end portion adjacent the central portion is substantially equal to the width dimension of the central portion; however, the width dimension of each end portion diminishes from a maximum adjacent the central portion to a minimum adjacent its outer end or wall. Highly satisfactory results have been obtained when the minimum width of the end portions has varied from ¼ to ½ of the maximum width adjacent the central portion.

With reference now to Figs. 1 and 4, it will be noted that pulverulent material will be emptied thru discharge port 12 disposed in the rear of hopper 10 onto impeller 14, which impeller, by reason of its high rotational speed, will render the pulverulent material discharged thereupon airborne. The presence of the side, top, and rear walls of the central and end portions will confine the scatter-distance or dispersion area of the pulverulent material whereby the density of the airborne pulverulent material will increase within the chamber to such an extent that it will, in effect, become saturated and be evenly and continuously dispersed thru the open bottom onto the surface of the ground.

Preferably, a depending apron 50, fabricated from canvas, or other flexible material, is secured to the lower periphery of each of the central and end portions, wherein the lower edge 52 of said flexible apron terminates adjacent, but in spaced relationship with the surface of the ground.

Uniformly, phenomenal results have been obtained from my device regardless of the particular type of "spreader" to which it is attached, and although I am unable to explain the precise reason therefor, it provides an even and uniform distribution of pulverulent material throughout its entire length regardless of the condition of the ground, whether bumpy or smooth.

Highly satisfactory results have been obtained when using a pulverulent distributor having the hereinabove described characteristics. It should be noted that the presence of sticks, twigs, stones and other extraneous material present in the pulverulent material will not clog, jam or otherwise impair the operating characteristics of the device, since these foreign substances, being too heavy to be airborne will fall quickly and harmlessly to the ground thru the open bottom of the chamber.

In those instances where the phosphate, or other pulverulent material, to be distributed is lumpy or balled-up by reason of too high a moisture content of the pulverulent material contained within hopper 10, there will be a tendency for such material to be thrown the length of end members 22 whereby to impinge upon end walls 36 thereof. When such a condition prevails, the ground pattern will indicate signs of stratification as evidenced by an excessive deposit of material adjacent the outer ends of the end portions.

I have found that the use of a baffle 60 fabricated from a sheet of flexible material, such as canvas, rubber, or the like, suspended about midway of the length of an end portion and with its upper edge spaced downwardly from and beneath the inner face of top wall 32 by a dimension approximating 30% to 45% of the overall height dimension of the side walls, and wherein the end edges are laterally spaced from their adjacent front or rear walls 30 and 34, by a dimension approximating 2½ inches, will effectively eliminate such stratification whereby a uniform ground pattern will be obtainable at all times even though the pulverulent material may be moist and have a tendency to ball-up, become lumpy or form pellets. The flexible barrier or baffle 60 is free to swing about and from a horizontal axis defined by transverse member 64 opposite portions of which may be suitably journaled in the front and rear walls, respectively, as clearly disclosed in Fig. 7. The presence of a barrier or baffle member 60 will eliminate the stratification which would otherwise occur in those instances when the pulverulent material of hopper 10 is moist, said barrier intercepting the travel of such pellets through to the end portions but without interrupting or impairing the desired distribution of the other airborne particles. At the present time, I am unable to explain the reason for this phenomenon; however, it is effectively and efficiently eliminated by the presence of the baffles, as indicated.

When it is desired to move the device from place to place, such as from field to field, end members 22 may be elevated to the position indicated in dotted outline in Fig. 1, it being understood that they may be retained in elevated position by attachment means denoted generally by the numeral 70.

The instant spreader attachment, by reason of its shape characteristics, enables material, such as phosphate, to be spread faster and more uniformly than has heretofore been possible.

Figure 8:
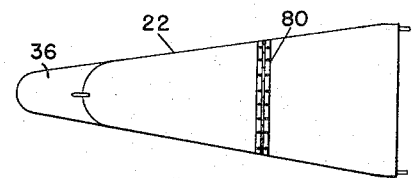

With reference now to Fig. 8 it will be observed that end portion 22 has been hinged as at 80 on the top wall between its ends thereby enabling a compact folding of the end portions whereby not to project or extend above the body of hopper 10 when those parts between hinges 42 and 80 are fully elevated. In those instances when end portions 22 have been subdivided by means of hinges 80, those portions between hinges 42 and 80 may be considered as intermediate end portions, whereas those portions beyond hinges 80 may be considered as outer end portions. It being further understood that the intermediate end portions are substantially U-shaped comprising front, top and rear walls, and that the outer end portions are likewise substantially U-shaped, including front, top, rear and outer end walls.

What is claimed is:

A spreader attachment for a pulverulent distributor of the type characterized by a hopper having a discharge port and impeller means for rendering airborne particles of material discharged thru said discharge port, said attachment comprising a substantially U-shaped central portion dimensioned to enclose the discharge port and said impeller means, said central portion including front, top and rear walls, and a pair of U-shaped end portions each including front, top, rear and outer end walls, wherein the overall length dimension of each of said end portions approximates twice the length dimension of said central portion, a baffle member disposed in and transversely of each end portion about midway of its length for intercepting the passage of particles projected into said end portions which are too heavy to be airborne, said end portions hingedly secured to said central portion for movement between lowered and raised positions relative thereto, said end portions when in lowered position combining with said central portion to define an elongated open-bottomed chamber within which airborne pulverulent materials from said hopper will accumulate on opposite sides of said baffles in sufficient concentration to effect a substantially uniform gravitational depositation thru said open bottom, and means operable for securing said central portion to the hopper of a pulverulent distributor.

References Cited in the file of this patent

UNITED STATES PATENTS

| | | |
|---|---|---|
| 772,941 | Kefauver | Oct. 25, 1904 |
| 896,178 | Tuttle | Aug. 18, 1908 |
| 1,616,303 | Campbell | Feb. 1, 1927 |
| 1,668,516 | Litchfield et al. | May 1, 1928 |
| 1,770,707 | McDow | July 15, 1930 |
| 2,120,169 | Baughman | June 7, 1938 |
| 2,204,099 | Allgrunn | June 11, 1940 |
| 2,281,212 | Stoltzfus | Apr. 28, 1942 |
| 2,307,313 | Wilson | Jan. 5, 1943 |
| 2,350,476 | Richey | June 6, 1944 |
| 2,500,681 | Hoffstetter | Mar. 14, 1950 |

FOREIGN PATENTS

| | | |
|---|---|---|
| 584,809 | Great Britain | Jan. 23, 1947 |